(12) United States Patent  
Ramsay et al.

(10) Patent No.: US 8,061,304 B1
(45) Date of Patent: Nov. 22, 2011

(54) SMALL PET WASHING APPARATUS

(76) Inventors: Jennifer Ramsay, Airdrie (CA); Arlen Friesen, Airdrie (CA)

(*) Notice: Subject to any disclaimer, the term of this patent is extended or adjusted under 35 U.S.C. 154(b) by 140 days.

(21) Appl. No.: 12/709,223

(22) Filed: Feb. 19, 2010

Related U.S. Application Data

(60) Provisional application No. 61/207,896, filed on Feb. 19, 2009.

(51) Int. Cl.
  *A01K 13/00* (2006.01)
  *A01K 29/00* (2006.01)
(52) U.S. Cl. ........................................ 119/671; 119/673
(58) Field of Classification Search .................. 119/671, 119/673, 674, 753
  See application file for complete search history.

(56) References Cited

U.S. PATENT DOCUMENTS

| | | | |
|---|---|---|---|
| 4,505,229 A | 3/1985 | Altissimo | |
| 4,930,453 A | 6/1990 | Laliberte | |
| 4,987,860 A * | 1/1991 | Davis | 119/671 |
| 5,279,257 A | 1/1994 | Temby | |
| 5,448,966 A | 9/1995 | McKinnon et al. | |
| 5,632,231 A | 5/1997 | Moore | |
| 5,662,069 A * | 9/1997 | Smith | 119/665 |
| 5,711,252 A | 1/1998 | Brandolino | |
| 6,688,257 B2 | 2/2004 | Lee | |
| 6,988,467 B1 * | 1/2006 | Smith | 119/675 |
| 7,100,538 B2 | 9/2006 | Motomura | |
| 7,107,937 B1 | 9/2006 | Anderson | |
| 7,921,812 B1 * | 4/2011 | Carrillo | 119/604 |

* cited by examiner

*Primary Examiner* — Yvonne R. Abbott

(57) ABSTRACT

An apparatus to aid in the bathing of cats, dogs, or similar small pets that is intended for countertop use over an existing a sink is herein disclosed, comprising a box-like structure with a hinged lid. The apparatus is designed such that the cat or dog can be secured within the enclosure with its head protruding from a foam rubber lined opening. A hose and valve connected thereto the apparatus are hooked up to a sink faucet providing a mixture of water and liquid soap which fills and pressurizes the hollow walls of the apparatus causing spraying of the pet from a plurality of water delivery apertures formed in the vertical walls. When completed, the pet is rinsed with clean water. Waste water from the washing process is strained and drained into the sink below. Finally, a dryer adapter coupling allows a user to dry the pet using a hair dryer while still inside the apparatus.

15 Claims, 8 Drawing Sheets

SMALL PET WASHING APPARATUS

RELATED APPLICATIONS

The present invention was first described in and claims the benefit of U.S. Provisional Application No. 61/207,896, filed Feb. 19, 2009, the entire disclosures of which are incorporated herein by reference.

FIELD OF THE INVENTION

The present invention relates generally to the field of animal care, and in particular, to an apparatus specially adapted to provide a simple and hygienic means for bathing and drying small domestic animals on a regular basis.

BACKGROUND OF THE INVENTION

Domesticated animal pets are a popular member of many households. Such animals are reliant upon their human caretakers for their basic needs. Among these needs are hygienic needs such as frequent bathing. The process of bathing common pets such as cats, dogs, and the like provides health benefits, prevents unwanted odors, and contributes to the overall appearance of the animal.

Many conventional methods of bathing animals are inconvenient in one (1) or more significant ways. Washing pets in common bath tubs can lead to smell or dirty tubs, difficult reaching for the caretaker, and uncomfortable brushing for the animal. Attempting to wash a pet outdoors is difficult and unpredictable, and leaves the animals prone to further dirtying. Utilizing other indoor water sources such as sinks can lead to clogged drains and the like. Taking the pet to a salon or otherwise hiring another individual to maintain the pet's appearance can result in very significant costs over the lifetime of the pet.

Various attempts have been made to provide apparatuses to aid in the household washing of a pet. Examples of these attempts can be seen by reference to several U.S. patents. U.S. Pat. No. 5,279,257, issued in the name of Temby, describes a pet washing and grooming apparatus. The Temby apparatus consists of a small tub with a flexible, transparent upper casing which allows a user to see and manipulate the pet.

U.S. Pat. No. 5,711,252, issued in the name of Brandolino, describes a pet bath apparatus. The Brandolino apparatus includes sloped floors and filters in order to carry and catch pet hair and the like during the bathing process.

U.S. Pat. No. 6,688,257, issued in the name of Lee, describes a pet dog washing apparatus. The Lee apparatus includes a plurality of sensors adapted to detect the presence of an animal, their proximity, and the like in order to provide automated bathing features.

While these devices fulfill their respective, particular objectives, each of these references suffer from one (1) or more of the aforementioned disadvantages. Many such apparatuses are not adaptable to work with common household water sources such as sink faucets and the like. Also, many such apparatuses do not provide capabilities for drying the pet after bathing. Furthermore, many such apparatuses do not allow the user a great amount of control during the bathing process. In addition, many such apparatuses do not provide height adjustment means in order to comfortable receive pets of different heights or sizes. Finally, many such apparatuses do not provide a plurality of spray portions which provide a comfortable and even wash to a pet. Accordingly, there exists a need for a pet cleaning and drying device without the disadvantages as described above. The development of the present invention substantially departs from the conventional solutions and in doing so fulfills this need.

SUMMARY OF THE INVENTION

In view of the foregoing disadvantages inherent in the prior art, it has been observed that there is need for a pet washing apparatus for restraining and bathing a small domestic pet. Such a pet washing apparatus including an outer enclosure and an inner enclosure connected thereto such that a spatial gap is formed between the outer and inner enclosures, a venturi unit affixed to the outer enclosure, a plurality of inner seals located along upper horizontal perimeter edges of the inner and outer enclosures respectively such that the inner seals are located within the spatial gap.

The pet washing apparatus further includes supply water tubing connected to the venturi unit and adapted to be connected to a supply water source and a plurality of water delivery apertures formed along inner vertical surfaces of the inner enclosure. In this manner, pressurized supply water is introduced into the outer enclosure in such that the pressurized supply water is subsequently discharged into the inner enclosure via the water delivery apertures.

The pet washing apparatus further includes a platform adjustably situated within the inner enclosure, a pair of drains located at a bottom surface of the outer enclosure, a plurality of drain conduits protruding downwardly from the drains and thereby draining waste water directly from the inner enclosure, and a drain valve located along a bottom surface of the outer enclosure for draining pressurized supply water directly from the spatial gap.

In one embodiment, the outer enclosure may include first and second access doors forming a pet head aperture therebetween, a dryer adapter connected to the outer enclosure and disposed opposite of the venturi unit, and a foam insert positioned within a perimeter of the pet head opening.

In one embodiment, the inner enclosure may be stably attached to side and bottom surfaces of the outer enclosure via the inner seals.

In one embodiment, the platform is horizontally and adjustably positioned between the inner vertical surfaces of the inner enclosure.

In one embodiment, the drain conduits extend from the drains along an inner bottom surface of the inner enclosure downwardly through the outer enclosure such that the drain conduits are sealed to both the outer and inner enclosures and thereby maintain internal supply water pressure within the spatial gap.

In one embodiment, the venturi unit is adapted to dispense and mix a liquid supplement with the pressurized supply water prior to entering the outer enclosure.

In one embodiment, an inline water pump is integrated to the supply water tubing and thereby increasing a pressure of the supply water.

The present invention further includes a method of utilizing a pet washing apparatus for restraining and bathing a small domestic pet. Such a method preferably includes the steps of: providing and connecting an outer enclosure and an inner enclosure to each other such that a spatial gap is formed between the outer and inner enclosures wherein the inner enclosure has a plurality of water delivery apertures formed along inner vertical surfaces thereof; providing and affixing a venturi unit to the outer enclosure; providing and locating a plurality of inner seals within the spatial gap by locating the inner seals along upper horizontal perimeter edges of the inner and outer enclosures respectively; and providing and connecting a supply water tubing to the venturi unit and a supply water source respectively.

The method may further include the steps of: providing and adjustably situating a platform within the inner enclosure; providing and locating a pair of drains at a bottom surface of the outer enclosure; providing a plurality of drain conduits protruding downwardly from the drains; and providing and locating a drain valve along a bottom surface of the outer enclosure. In this manner, pressurized supply water is introduced into the outer enclosure in such a manner that the pressurized supply water is subsequently discharged into the inner enclosure via the water delivery apertures.

The method may further include the steps of: draining waste water directly from the inner enclosure; and draining pressurized supply water directly from the spatial gap.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| 10 | small pet washing apparatus |
| 15 | pet head aperture |
| 20 | outer enclosure |
| 21 | first access door |
| 22 | first pet opening section |
| 23 | second access door |
| 24 | second pet opening section |
| 25 | hinge |

-continued

DESCRIPTIVE KEY

| 27 | drain |
| 28 | clasp |
| 29 | drain conduit |
| 30 | dryer adapter |
| 32 | venturi unit |
| 33 | fluid port |
| 34 | liquid supplement |
| 35 | venturi tube |
| 36 | liquid supplement reservoir |
| 37 | reservoir cap |
| 39 | fluid port connector |
| 40 | insert |
| 41 | insert groove |
| 42 | dimension 'B' |
| 43 | inner diameter |
| 50 | inner enclosure |
| 52 | water delivery aperture |
| 56 | inner seal |
| 59 | supply water tubing |
| 60 | platform |
| 61 | platform tab |
| 62 | platform slot |
| 63 | support block |
| 64 | perforation |
| 68 | standoff |
| 70 | spatial gap |
| 75 | drain valve |
| 92 | tubing connector |
| 94 | spigot adapter |
| 95 | water valve |
| 96 | valve handle |
| 100 | pet |
| 110 | water spigot |
| 111 | supply water |
| 112 | waste water |
| 115 | sink |
| 117 | sink drain |
| 120 | drying device |
| 130 | fastener |
| 140 | inline water pump |
| 142 | power cord |
| 144 | motor housing |
| 146 | inlet connection |
| 148 | outlet connection |
| 150 | hose clamp |

DETAILED DESCRIPTION OF THE PREFERRED EMBODIMENT

Figure 5:
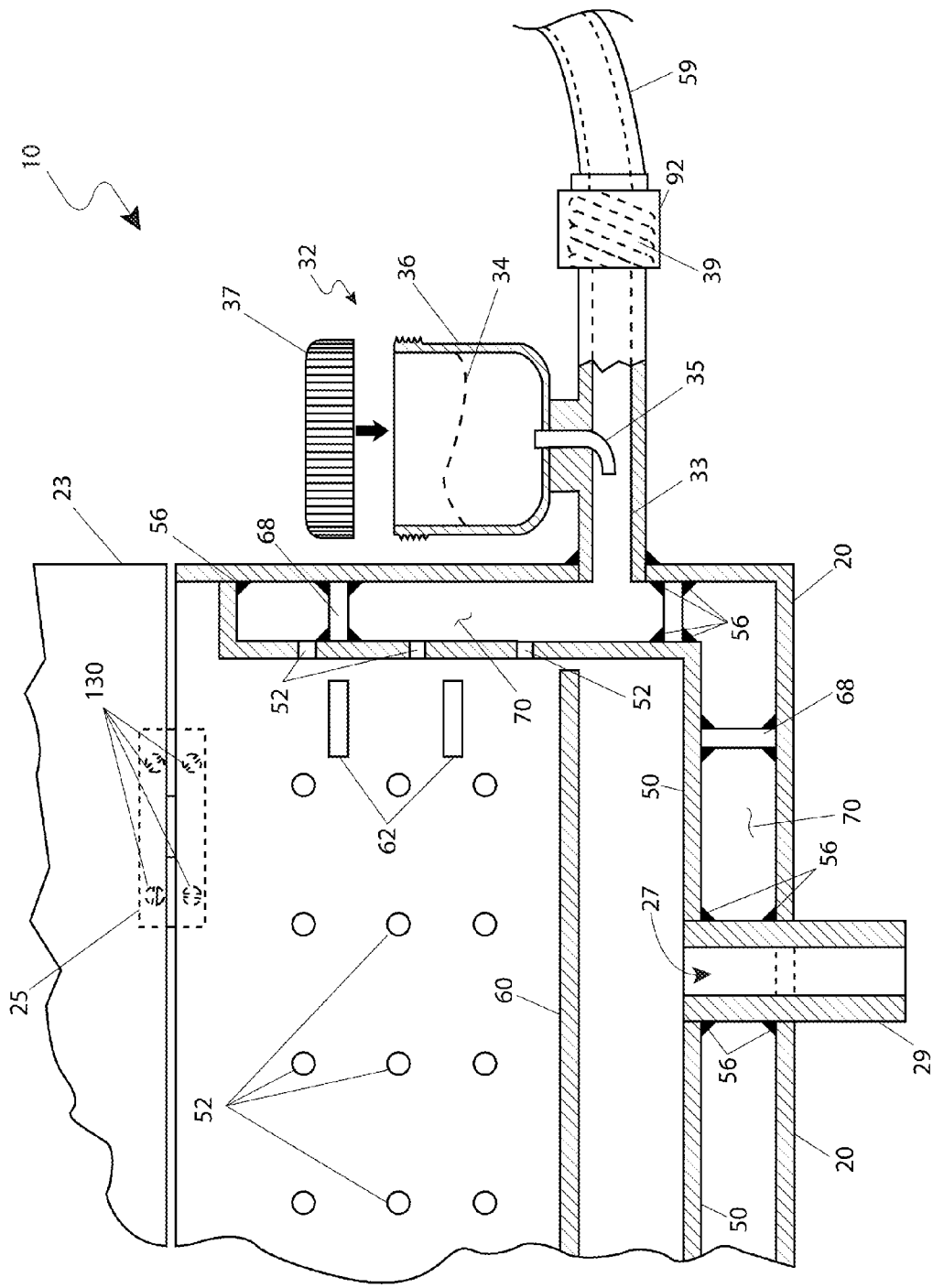
FIG. 5 is another section view of the small pet washing apparatus 10 taken along section line C-C (see FIG. 2), according to the preferred embodiment of the present invention.
Figure 6:
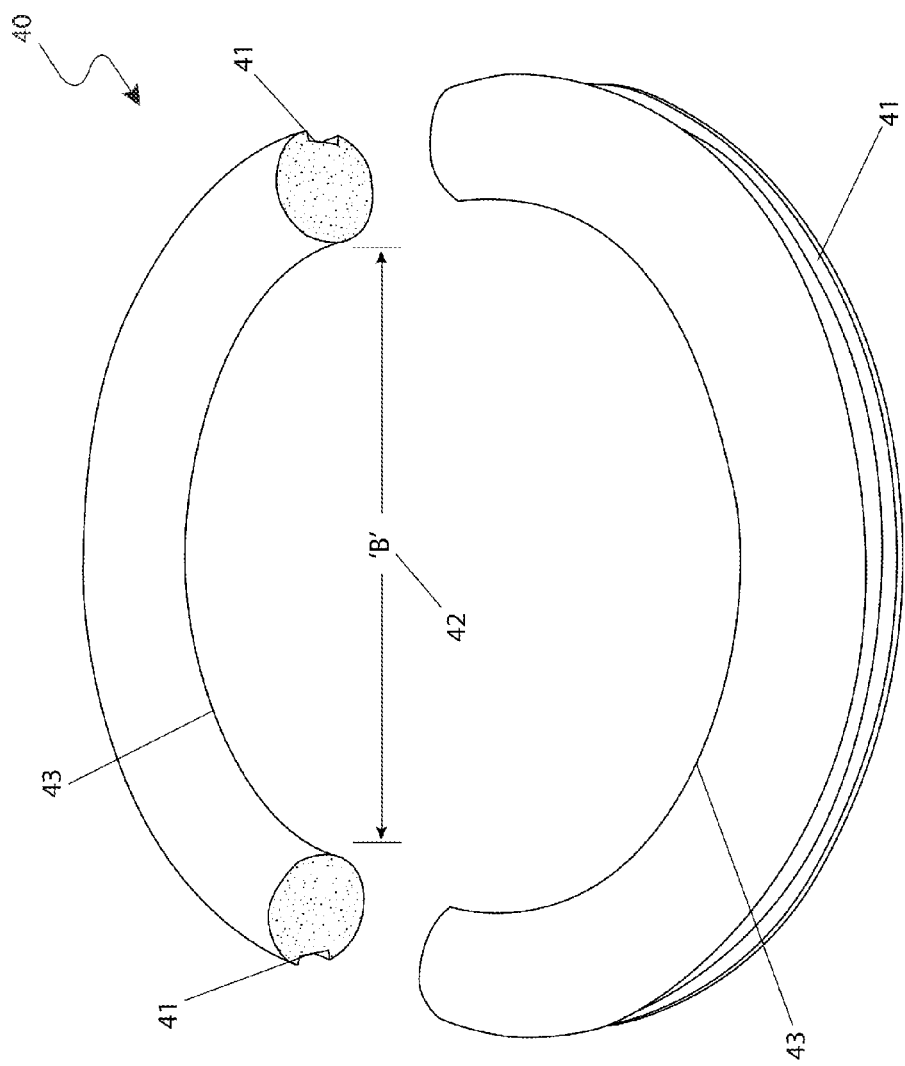
FIG. 6 is a close-up view of an insert portion 40 of the small pet washing apparatus 10, according to the preferred embodiment of the present invention; and, FIG. 7 is an environmental view of the small pet washing apparatus 10 depicting an alternate inline water pump potion 140, according to the preferred embodiment of the present invention.
Figure 7:
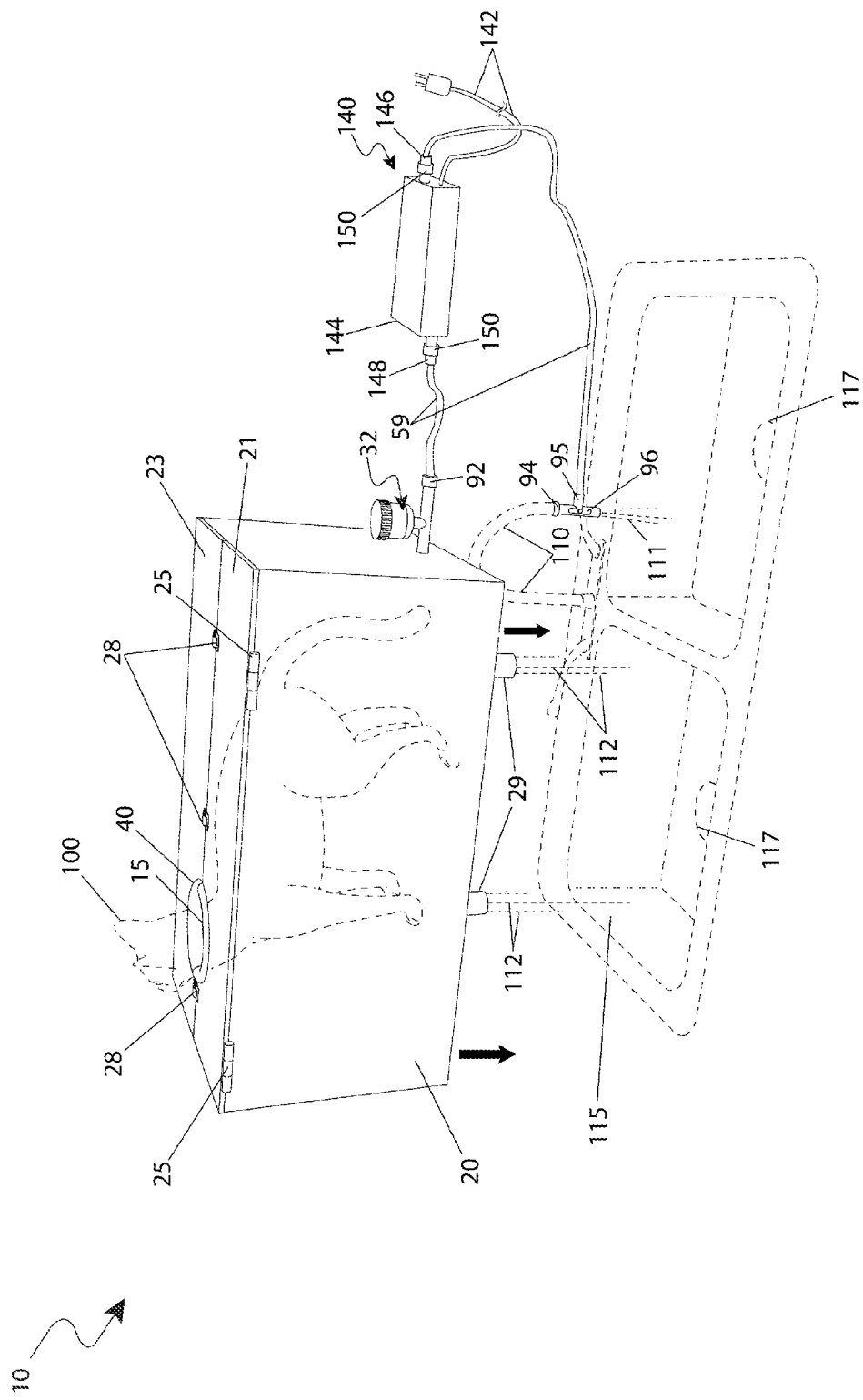

The best mode for carrying out the invention is presented in terms of its preferred embodiment, herein depicted within FIGS. 1 through 6 and in terms of an alternate embodiment as depicted within FIG. 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a small pet washing apparatus (herein described as the "apparatus") 10, which provides a means for restraining and bathing a small domestic pet 100 such as a small dog, a cat, or a similarly shaped pet. The apparatus 10 is portable and rests upon a conventional sink 115 or similar vessel comprising a water spigot 110 and a drain 117 means. The apparatus 10 provides a rectangular box structure comprising an outer enclosure 20, an inner enclosure 50, and a hinged lid 21, 23, thereby forming a rectangular inner space having surrounding hollow wall structures which are filled with pressurized water 111 directed upon the pet 100 via a plurality of water delivery apertures 52 along inner wall surfaces. Upon completion of the washing process, the apparatus 10 utilizes a common hair dryer 120 to then dry the pet 100.

Figure 1:
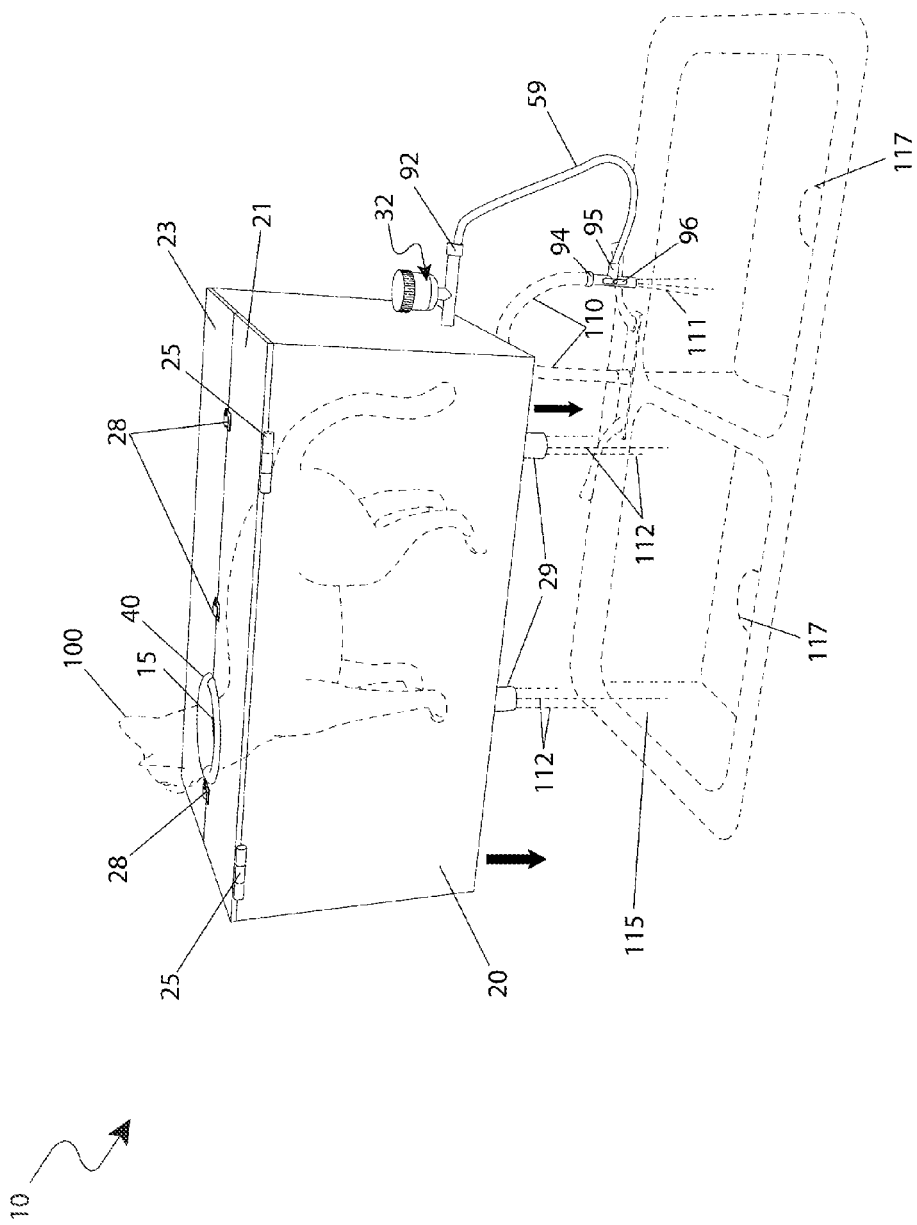
FIG. 1 is an environmental view of a small pet washing apparatus 10 depicting an in-use state upon a kitchen sink 115, according to the preferred embodiment of the present invention.

Referring now to FIG. 1, an environmental view of the apparatus 10, according to the preferred embodiment of the present invention, is disclosed. The apparatus 10 is made of a lightweight, durable material such as plastic, fiberglass, or the like and manufactured through common extruding and molding processes. The apparatus 10 is envisioned to be introduced being molded in various colors and patterns to match an existing decor, or may be molded in transparent or translucent plastic as well, based upon a user's preference. The apparatus 10 comprises an outer enclosure 20 and an inner enclosure 50. The inner enclosure 50 is positioned and connected thereto said outer enclosure 20 via a plurality of standoffs 68 in a parallel manner so as to retain a consistent spatial gap 70 therebetween (see FIG. 3a). The apparatus 10 is to be suitably sized so as to be portable and capable of temporarily housing a small house pet 100 during washing. The apparatus 10 is envisioned to have approximate dimensions of eight (8) inches in depth, ten (10) inches in height, and thirteen (13) inches in length; however, the apparatus 10 may be introduced in various sizes such as "small", "medium", and "large" so as to accommodate various size pets 100, and as such should not be interpreted as a limiting factor of the apparatus 10. The outer enclosure 20 is to be of a rectangular structure being defined by four (4) side walls, a bottom panel, and two (2) hingedly attached access doors 21, 23 which form the top surface of said outer enclosure 20 (see FIG. 2). The outer enclosure 20 further comprises a first pet opening section 22 and a second pet opening section 24 which jointly define a pet head aperture 15 therein a top surface of said outer enclosure 20 providing a comfortable constraining means thereto the pet 100 therewithin the apparatus 10.

The outer enclosure 20 further provides a plumbing means to receive a flow of pressurized supply water 111, thereby filling the spatial gap 70 between the outer 20 and inner 50 enclosures. Said supply water 111 is subsequently discharged onto the pet 100 via a plurality of water delivery apertures 52 positioned along inner vertical surfaces of the inner enclosure 50 (see FIGS. 3a and 4). After use, a drain valve 75 located along a bottom surface of the outer enclosure 20 allows complete drainage of residual supply water 111 from within the spatial gap 70. The outer enclosure 20 also provides a means to optionally mix a liquid supplement 34 such as shampoo, flea medication, or the like, thereinto said supply water 111 via a liquid venturi unit 32. The venturi unit 32 is permanently affixed thereto a side surface of the outer enclosure 20. A length of supply water tubing 59 provides a plumbing connection therebetween said venturi unit 32 and a source of supply water 111 such as an existing sink spigot 110. Additional plumbing components work in conjunction therewith the water supply tubing 59 including a common spigot adapter 94, a three-way water valve 95, a fluid port connector 39, and a tubing connector 92.

The spigot adapter 94 comprises a common sliding-collar-type two-piece fitting being similar to like units which are used to connect portable dishwashers thereto a water spigot 110. Said spigot adapter 94 allows easy disconnection of the apparatus 10 therefrom the water spigot 110 when not in use. Said spigot adapter 94 is also threadingly attached thereto a common three-way water valve 95 which comprises a common valve handle 96 thereupon providing a manual means for a user to select an "OFF" position, an "ON" position to direct supply water 111 thereto the apparatus 10, and a "BYPASS" position to direct said supply water 111 thereinto a subjacent sink 115 for purposes of pre-adjusting a temperature of said supply water 111, thereby reducing risk of burning the pet 100.

Figure 4:
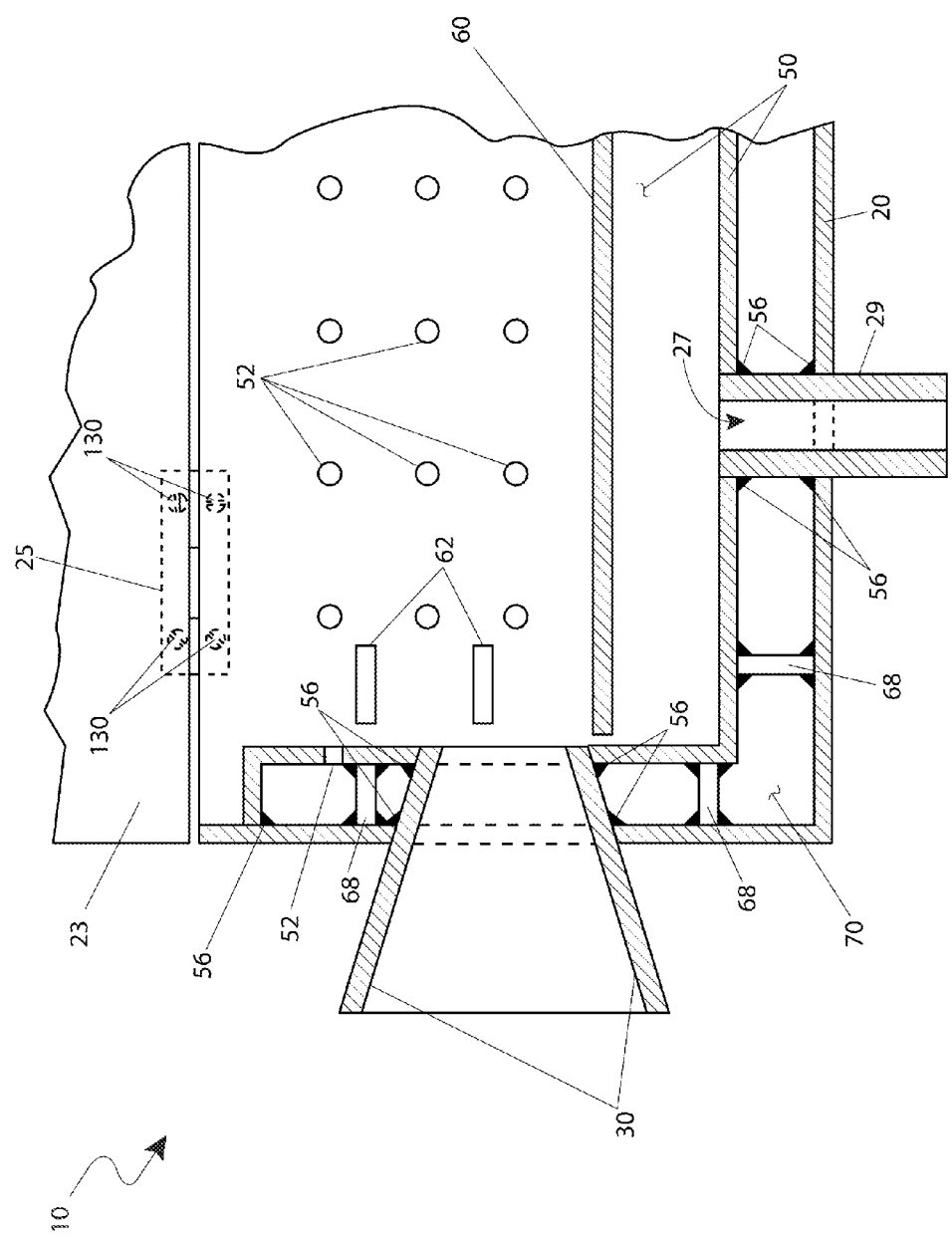
FIG. 4 is a section view of the small pet washing apparatus 10 taken along section line A-A (see FIG. 2), according to the preferred embodiment of the present invention.

The apparatus 10 provides a means to drain waste water 112 produced by the pet washing process therefrom the inner enclosure 50 via a pair of drain conduits 29 which protrude downwardly from a pair of drains 27 located at a bottom surface of the outer enclosure 20 (see FIG. 4). The apparatus 10 is to be positioned so as to rest upon a sink 115, thereby directing said waste water 112 exiting said drain conduits 29, thereinto an existing sink drain 117, thereby utilizing an existing drainage system within a residence.

Figure 2:
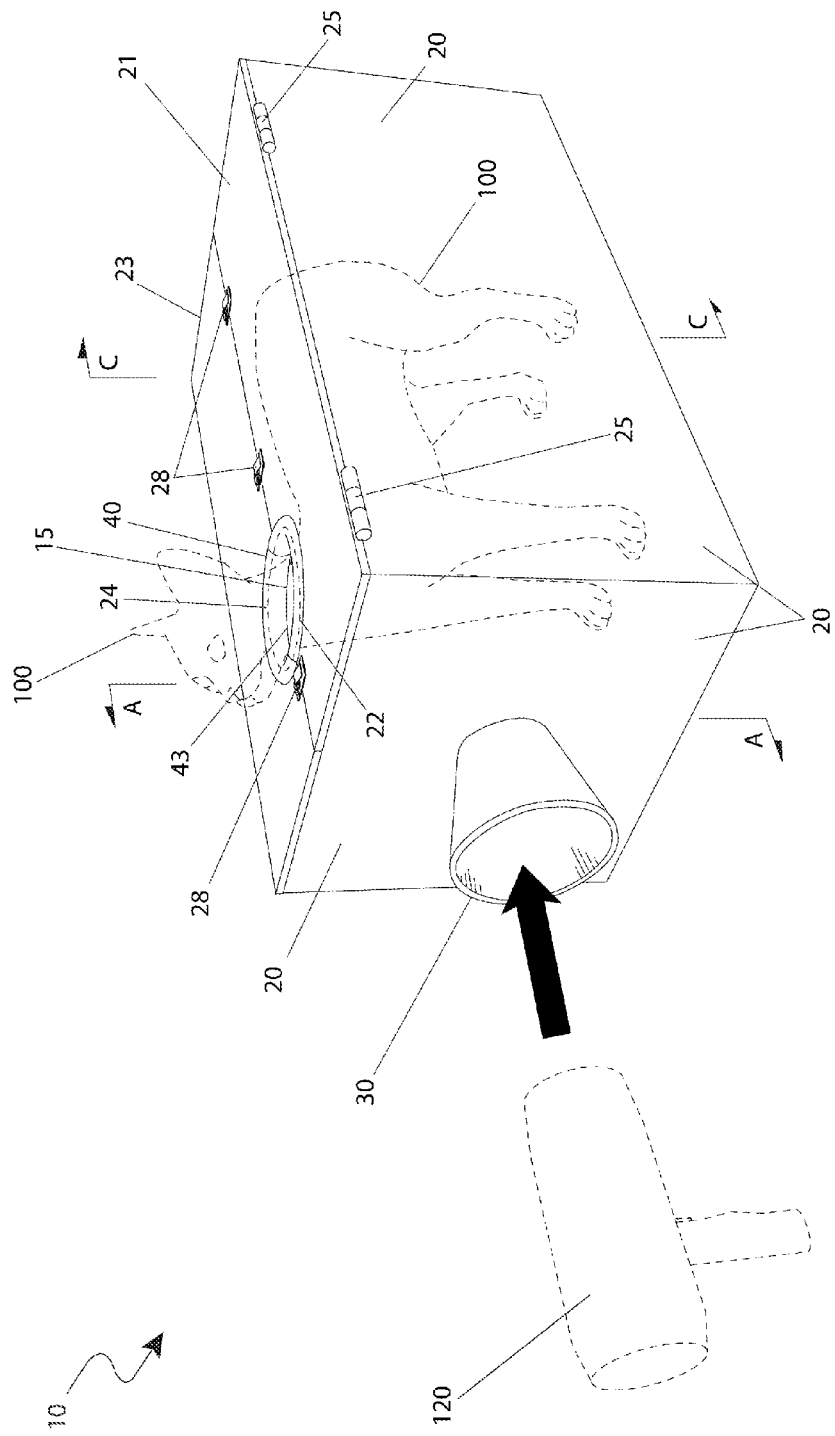
FIG. 2 is a front perspective view of the small pet washing apparatus 10, according to the preferred embodiment of the present invention.

Referring now to FIG. 2, a front perspective view of the small pet washing apparatus 10, according to the preferred embodiment of the present invention, is disclosed. The apparatus 10 comprises a first access door 21, a second access door 23, four (4) common axial hinges 25 being arranged in pairs along a common joint, three (3) clasps 28, a dryer aperture 30, and an insert 40. The access doors 21, 23 are hingedly attached thereto opposing upper edge portions of two (2) lengthwise sidewall portions of the outer enclosure 20 via the hinges 25. Said hinges 25 are affixed thereto the outer enclosure 20 in a conventional manner using fasteners 130 (see FIGS. 3a, 4, and 5). However, it is understood that said hinges 24 may also be integrally-molded thereinto said access doors 21, 23 and the outer enclosure 20 with equal benefit and as such should not be interpreted as a limiting factor of the apparatus 10.

Said access doors 21, 23 may be pivoted downwardly and secured therein a relative coplanar horizontal orientation when the apparatus 10 is in use, via three (3) locking clasps 28 along adjacent edges of said access doors 21, 23. Said clasps 28 are envisioned to comprise cam-locking ring-type devices being common in the industry.

The access doors 21, 23 comprise a first pet opening section 22 and a second pet opening section 24, respectively. The pet opening sections 22, 24 comprise complementing halves of a circular or oval-shaped opening formed along adjacent edges of the access doors 21, 23. Upon closing said access doors 21, 23 the pet opening sections 22, 24 jointly define a circular or ovular opening 15, thereby providing a means for neck and head portions of the pet 100 to protrude upwardly therefrom the apparatus 10 during washing. The pet opening sections 22, 24 provide attachment of a comfortable two-piece foam-rubber insert 40 along perimeter edges thereof which encircles and provides additional comfort and safety thereto the pet's 100 neck area (see FIG. 6).

Figure 3A:
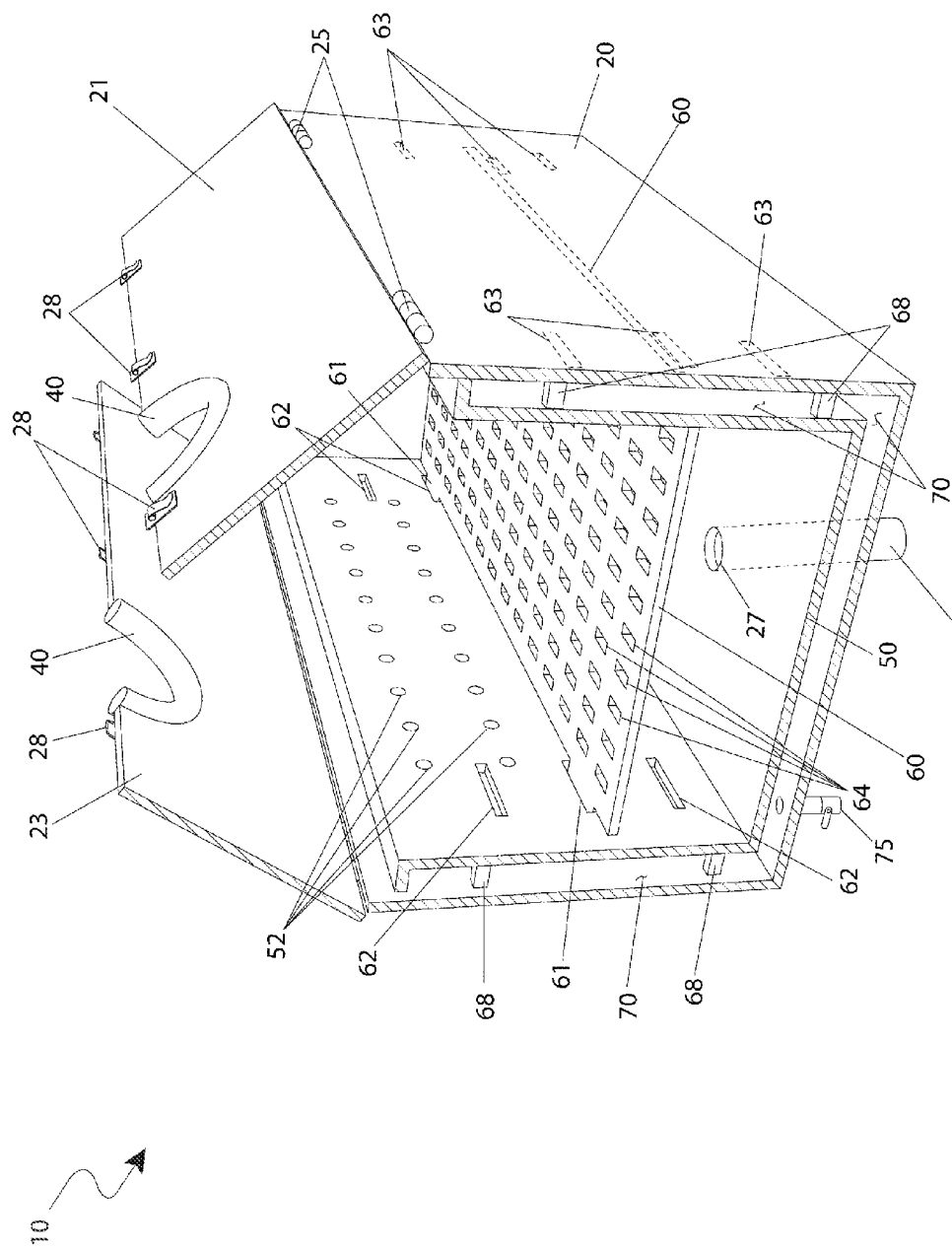
FIG. 3a is a partial cut-away view of the small pet washing apparatus 10 depicting a platform slot portion 62, according to the preferred embodiment of the present invention.
Figure 3C:
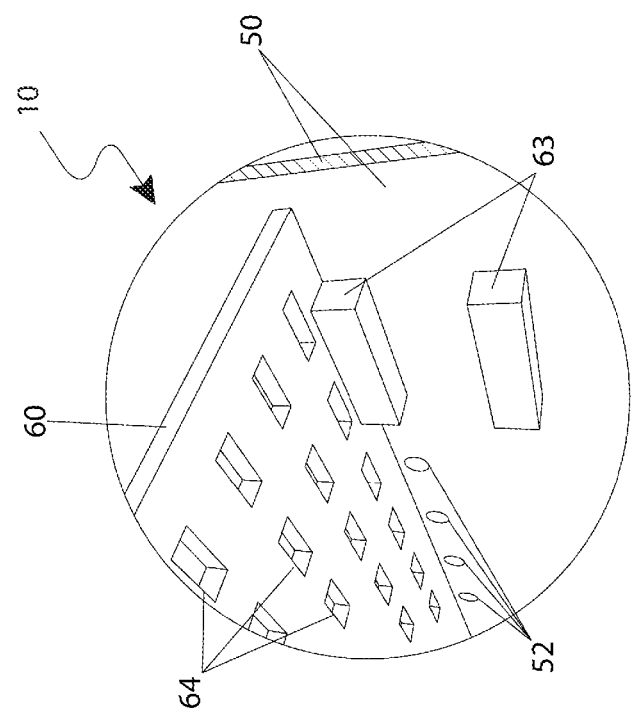
FIG. 3c is another partial cut-away view of the small pet washing apparatus 10 depicting a support block portion 63, according to the preferred embodiment of the present invention.
Figure 3B:
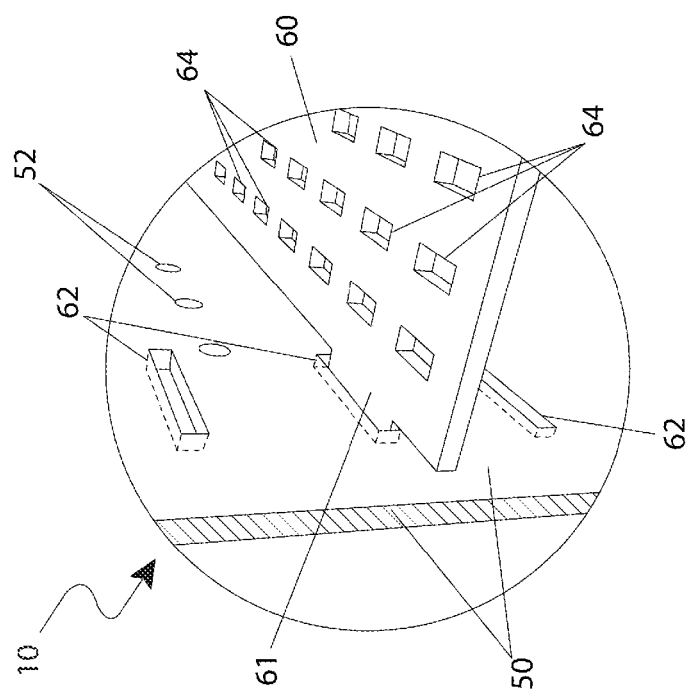
FIG. 3b is another partial cut-away view of the small pet washing apparatus 10 depicting a platform slot portion 62, according to the preferred embodiment of the present invention.

Referring now to FIGS. 3a, 3b, and 3c, various views of the platform portion 60 of the apparatus 10, according to the preferred embodiment of the present invention, are disclosed. The apparatus 10 comprises a pair of drain conduits 29 each in fluid communication with a pair of drains 27, a plurality of water delivery apertures 52, a plurality of inner seals 56, a platform 60, a pair of platform tabs 61, a pair of platform slots 62, and a pair of platform support blocks 63. The inner enclosure 50 comprises a plurality of equally-spaced water delivery apertures 52 being approximately one-sixteenth (1/16) of an inch in diameter and located at various positions thereal-ong vertical wall portions of said inner enclosure 50. The water delivery apertures 52 are formed so as to provide various water spray angles therefrom, being delivered to all body areas of the pet 100. The apparatus 10 is envisioned to comprise an appropriate number of water delivery apertures 52 having appropriate diameters so as to balance a water pressure as provided by the water spigot 110, with desired supply water 111 spraying characteristics during the washing process.

The inner enclosure 50 is attached and stably positioned within the outer enclosure 20 along side and bottom surfaces via a plurality of inner seals 56 located along an upper horizontal perimeter edge joining the inner enclosure 50 thereto the outer enclosure 20, as well as around the drain conduits 29. Additional strengthening attachment therebetween said outer 20 and inner 50 enclosures is provided by a plurality of standoffs 68 being rigidly affixed therebetween said outer 20 and inner 50 enclosures (see FIGS. 4 and 5).

The platform 60 provides a height-adjustable standing surface for the pet 100. Said platform 60 comprises a rigid rectangular panel approximately one-half (½) inch thick which extends horizontally therebetween inside vertical surfaces of the inner enclosure 50. Said platform 60 provides an adjustable height means via a pair of platform tabs 61 integrally-molded therealong one (1) side edge which are inserted thereinto correspondingly sized and positioned platform slots 62 being molded thereinto a vertical wall portion of the inner enclosure 50 at three (3) different elevations. The opposing edge of the platform 60 rests upon a plurality of support blocks 63 being correspondingly positioned in relation to the aforementioned platform slots 62, thereby positioning the platform 60 therein a horizontal orientation within the inner enclosure 50 thereat a desired height which corresponds thereto a height of a pet 100 to be washed (see FIGS. 4 and 5). The platform 60 further comprises a plurality of molded-in perforations 64 which provide a fluid straining means thereto produced waste water 112, thereby removing pet hair and other contaminants while providing sufficient drainage therethrough, during the washing process. Said perforations 64 may comprise various geometric shapes such as rectangles, circles, or the like, and extend therethrough the platform 60. Although the platform 60 is illustrated here being supported by said slots 62 and blocks 63, it is understood that various other means may be provided such as pins, clips, various molded-in features, and the like, without deviating from the concept and as such should not be viewed as a limiting factor of the apparatus 10.

Referring now to FIGS. 4 and 5, section views of the apparatus 10, according to the preferred embodiment of the present invention, are disclosed. The apparatus 10 comprises a pair of drain conduits 29, a venturi unit 32, and a dryer adapter 30. The drain conduits 29 comprise short lengths of plastic tubing approximately one (1) inch in diameter, each extending therefrom and in fluid communication with a pair of drains 27 along an inner bottom surface of the inner enclosure 50 downwardly through the outer enclosure 20 being sealed thereto both said outer 20 and inner 50 enclosures via respective inner seals 56, thereby maintaining internal pressure within the spatial gap 70 as well as providing additional stiffening support therebetween said outer 20 and inner 50 enclosures. Waste water 112 from the inner enclosure 50 exits the apparatus 10 via the drains 27, then is routed through the drain conduits 29 and received thereinto an existing subjacent sink drain 117.

The venturi unit 32 comprises a fluid port 33, a liquid supplement reservoir 36, a reservoir cap 37, and a liquid supplement valve 38. The venturi unit 32 provides connection of the outer enclosure 20 thereto a flow of pressurized supply water 111 therefrom an existing water spigot 110 and also provides a means to mix a liquid supplement 34 such as shampoo, flea medication, or the like thereinto said supply water 111 via an internal venturi tube 35. The venturi unit 32 is permanently affixed thereto and extends perpendicularly therefrom a side surface of the outer enclosure 20 via an integral fluid port 33. Said venturi unit 32 further comprises a top-mounted gravity-fed liquid supplement reservoir 36, a reservoir cap 37, and a fluid port connector 39. The liquid supplement reservoir 36 is to provide a sufficient internal space to contain a desired amount of liquid supplement 34 therewithin. The liquid supplement reservoir 36 provides threaded attachment thereto the reservoir cap 37 along a top cylindrical edge, thereby providing a sealed pressure vessel capable of withstanding a hydraulic pressure therefrom the pressurized supply water 111. The fluid port connector 39 provides threaded removable attachment of the venturi unit 32 thereto the aforementioned tubing connector portion 92 of the supply water tubing 59 (see FIG. 1). The venturi unit 32 provides conventional venturi feeding functionality in a similar manner as common power washers, garden fertilizer sprinkler canisters, and the like.

The apparatus 10 further comprises a dryer adapter 30 which extends therefrom and is sealed thereto a side wall of the outer enclosure 20 opposite the aforementioned venturi unit 32. The dryer adapter 30 is also affixed and sealed thereto an adjacent side wall of the inner enclosure 50, thereby maintaining internal pressure within the spatial gap 70. The dryer adapter 30 comprises a tapering conical plastic member sized so as to enable a drying device 120 such as a common electric hair dryer or the like, to be removably inserted thereinto the apparatus 10 in order to dry the pet 100 following the washing process. Furthermore, the dryer adapter 30 is appropriately sized to provide a mechanical limitation such that a drying device 120 cannot extend thereinto the inner enclosure 50 and possibly burn the pet 100.

The apparatus 10 comprises a plurality of inner seals 56 forming water-tight connections therebetween major components which require hydraulic isolation including the outer 20 and inner 50 enclosures, the drain conduits 29, the dryer adapter 30, and the fluid port 33. Said inner seals 56 are envisioned to comprise common plastic joints utilizing methods such as durable adhesives, plastic welding, epoxies, or the like, thus forming a durable water-tight seal. Additional strengthening between the outer 20 and inner 50 enclosures is provided by a plurality of standoffs 68 being rigidly affixed within the spatial gap 70 formed therebetween said enclosures 20, 50. Said standoffs 68 comprise a cylindrical plastic shape approximately one (1) inch long being rigidly affixed thereto opposing inner surfaces of said enclosures 20, 50 using adhesives, plastic welding, epoxies, or the like. Said standoffs 68 may be provided at various locations within the spatial gap 70 to obtain desired rigidity and strength within the apparatus 10.

Referring now to FIG. 6, a close-up view of an insert portion 40 of the apparatus 10, according to the preferred embodiment of the present invention, is disclosed. The first 21 and second 24 access doors provide respective attachment of a comfortable two-piece foam-rubber insert 40 along perimeter edges of the respective first 22 and second 24 pet opening sections. The insert 40 forms a pet head aperture 15 which encircles an occupying pet's 100 neck in a comfortable manner during washing. The insert 40 comprises a generally torus-shaped member being split thereinto two (2) equal halve portions coincidental therewith edge portions of the access doors 21, 23. Each half portion of the insert 40 is envisioned to be removably secured thereto the first 22 and second 24 pet opening sections via an insert groove 41 being integrally molded thereinto a major diameter region of said insert 40. The insert groove 41 comprises a recessed portion having a rectangular cross section being sized so as to fit snuggly upon respective first 22 and second 24 pet opening sections. It is understood that the insert 40 is to be introduced in different sizes having corresponding inner diameters 43, represented here as dimension 'B' 42. One (1) or more inserts 40 may be purchased by a user, thereby providing a variety of inner diameters 43 having corresponding dimension 'B' diameters for use with correspondingly shaped pets 100.

Referring now to FIG. 7, an environmental view of the apparatus 10 depicting an alternate inline water pump portion 140, according to an alternate embodiment of the present invention, is disclosed. An alternate model of the apparatus 10 may be introduced providing an inline water pump 140 which is to be integrated thereinto the aforementioned supply water tubing 59 thereat an intermediate location, to increase a pressure of the supply water 111 and subsequently improve spraying characteristics therefrom the water delivery apertures 52. Said increased pressure is envisioned to be especially beneficial in particular applications of the apparatus 10 where available supply water 11 comprises a low pressure condition. Increased pressure produced by the inline water pump 140 provides improved supply water 111 dispersal therethrough the water delivery apertures 52. The inline water pump 140 is envisioned to comprise a commercially available electric motorized unit comprising expected features common to inline water pumps such as, but not limited to: a power cord 142, a motor housing 144, an inlet connection 146, an outlet connection 148, and a pair of hose clamps 150.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 7.

The method of utilizing the preferred embodiment of the apparatus 10 may be achieved by performing the following steps: procuring an appropriately sized model of the apparatus 10 based upon an intended pet 100 to be washed; pre-assembling the spigot adapter 94, water valve 95, and the tubing connector 92 thereto the supply water tubing 59 using conventional plumbing methods, if not previously assembled; installing the spigot portion of the spigot adapter 94 thereto an existing water spigot 110; joining the two (2) portions of the spigot adapter 94; threadingly connecting the pre-assembled water supply water tubing 59 thereto the male threaded connector portion 32 of the venturi unit 32; threadingly removing the reservoir cap 37; filling the liquid supplement reservoir 36 with a liquid supplement 34 such as shampoo, flea medication, or the like; replacing the reservoir cap 37; unlatching the clasps 28; opening the access doors 21, 23; attaching a properly sized insert 40 thereto respective first 22 and second 24 pet opening sections of the access doors 21, 23 depending on the size of the pet 100 to be washed; inserting and attaching the platform 60 thereinto the platform slots 62 and onto the support blocks 63 within the inner enclosure 50 thereat an appropriate position based upon a height of the pet 100; placing said pet 100 thereinto said inner enclosure 50 thereon the platform 60 therein a standing position; closing the access doors 21, 23, thereby securing the half-portions of the insert 40 into a pet head aperture 15 around a neck area of the pet 100; locking the clasps 28; adjusting a temperature of the supply water 111 by turning the valve handle portion 96 of the water valve 95 towards "BYPASS" to direct said water 111 downwardly into the sink 115; adjusting the existing water spigot 110 controls to obtain a desired supply water 111 temperature; turning the valve handle 96 towards "ON" to direct the supply water 111 thereinto the apparatus 10, thereby filling the spatial gap 70 with a pressurized mixture of supply water 111 and liquid supplement 34 from the venturi unit 32; allowing said mixture to be sprayed thereupon body portions of said pet 100 therefrom the water delivery apertures 52; allowing sufficient time for the liquid supplement 34 and supply water 111 mixture to be completely sprayed thereonto the pet 100; allowing additional time to rinse the pet 100 with pure supply water 111 from the water spigot 110; turning off the supply water 111 by turning the valve handle 96 to the "OFF" position; allowing waste water 112 to drain therefrom the inner enclosure 50 and spatial gap 70 downwardly therethrough the drains 27 and into the drain conduits 29 and the sink drain portion 117 of the sink 115; manually positioning a drying device 120 such as a common hair dryer thereinto the dryer adapter 30; allowing a sufficient amount of time for the drying device 120 to provide a warm airflow to pass therethrough the dryer adapter 30 and thereinto the inner enclosure 50, thus drying the pet 100; unlatching the clasps 28 and pivoting the access doors 21, 23 outwardly to remove the pet 100 therefrom said apparatus 10; turning off the supply water 111 using the existing water spigot 110 controls; disconnecting the spigot adapter 94 thereat the water spigot 110; opening the drain valve 75 located along a bottom surface to remove remaining supply water 111 therefrom the spatial gap 70; removing and storing the apparatus 10 until once again needed; and, benefiting from efficiency, cleanliness, and minimal stress placed on a pet 100 during washing, afforded a user of the present apparatus 10.

During use of the apparatus 10, the water supply tubing 59 is attached thereto the fluid port connector 39 allowing the supply water 111 to fill an open area provided by the spatial gap 70 therebetween the outer enclosure 20 and the inner enclosure 50. Due to the sealing function of the inner seals 56, the water pressure builds therewithin the spatial gap 70 and subsequently begins to spray therefrom the water delivery apertures 52 thereinto the inside area of the inner enclosure 50 and thereon the occupying pet 100. The platform 60 comprises a plurality of fine perforations 64 to strain hair and other debris therefrom the waste water 112 as it is drained therefrom the inner enclosure 50 and through the drains 27 and drain conduits 29 located therealong bottom portions of the inner enclosure 50.

The method of utilizing the alternate embodiment of the apparatus 10 utilizing the inline water pump 140 may be achieved by performing the following steps: installing the inline water pump 140 thereat an intermediate location along the supply water tubing 59 using the inlet 146 and outlet 148 connections and supplied hose clamp portions 150 of the inline water pump 140; connecting the pre-assembled supply water tubing 59 thereto the spigot 110 and venturi unit 32 as described above; connecting the inline water pump 140 thereto an available electrical power source using the power cord 142; increasing a supply water 111 pressure within the spatial gap 70 during normal operation of the apparatus 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pet washing apparatus for restraining and bathing a small domestic pet, said pet washing apparatus comprising:
   an outer enclosure and an inner enclosure connected thereto such that a spatial gap is formed between said outer and inner enclosures;
   a venturi unit affixed to said outer enclosure;
   a plurality of inner seals located along said inner and outer enclosures respectively, said inner seals being located within said spatial gap;
   a supply water tubing connected to said venturi unit and adapted to be connected to a supply water source;
   a plurality of water delivery apertures formed along inner vertical surfaces of said inner enclosure;
   wherein pressurized supply water is introduced into said outer enclosure in such a manner that said pressurized supply water is subsequently discharged into said inner enclosure via said water delivery apertures;
   a platform adjustably situated within said inner enclosure;
   a pair of drains located at a bottom surface of said outer enclosure;
   a plurality of drain conduits protruding downwardly from said drains and thereby draining waste water directly from said inner enclosure; and,
   a drain valve located along a bottom surface of said outer enclosure for draining pressurized supply water directly from said spatial gap.

2. The pet washing apparatus of claim 1, wherein said outer enclosure comprises:
   first and second access doors forming a pet head aperture therebetween;
   a dryer adapter connected to said outer enclosure and disposed opposite of said venturi unit; and,
   a foam insert positioned within a perimeter of said pet head opening.

3. The pet washing apparatus of claim 1, wherein said inner enclosure is stably attached to side and bottom surfaces of said outer enclosure via said inner seals.

4. The pet washing apparatus of claim 1, wherein said platform is horizontally and adjustably positioned between said inner vertical surfaces of said inner enclosure.

5. The pet washing apparatus of claim 1, wherein said drain conduits extend from said drains along an inner bottom surface of said inner enclosure downwardly through said outer enclosure such that said drain conduits are sealed to both said outer and inner enclosures and thereby maintain internal supply water pressure within said spatial gap.

6. The pet washing apparatus of claim 1, wherein said venturi unit is adapted to dispense and mix a liquid supplement with said pressurized supply water prior to entering said outer enclosure.

7. The pet washing apparatus of claim 1, further comprising: an inline water pump integrated to said supply water tubing and thereby increasing a pressure of said supply water.

8. A pet washing apparatus for restraining and bathing a small domestic pet, said pet washing apparatus comprising:
   an outer enclosure and an inner enclosure connected thereto such that a spatial gap is formed between said outer and inner enclosures;
   a venturi unit affixed to said outer enclosure;
   a plurality of inner seals located along upper horizontal perimeter edges of said inner and outer enclosures respectively, said inner seals being located within said spatial gap;
   a supply water tubing connected to said venturi unit and adapted to be connected to a supply water source;
   a plurality of water delivery apertures formed along inner vertical surfaces of said inner enclosure;
   wherein pressurized supply water is introduced into said outer enclosure in such a manner that said pressurized supply water is subsequently discharged into said inner enclosure via said water delivery apertures;
   a platform adjustably situated within said inner enclosure;
   a pair of drains located at a bottom surface of said outer enclosure;
   a plurality of drain conduits protruding downwardly from said drains and thereby draining waste water directly from said inner enclosure; and,
   a drain valve located along a bottom surface of said outer enclosure for draining pressurized supply water directly from said spatial gap.

9. The pet washing apparatus of claim 8, wherein said outer enclosure comprises:
   first and second access doors forming a pet head aperture therebetween;
   a dryer adapter connected to said outer enclosure and disposed opposite of said venturi unit; and,
   a foam insert positioned within a perimeter of said pet head opening.

10. The pet washing apparatus of claim 8, wherein said inner enclosure is stably attached to side and bottom surfaces of said outer enclosure via said inner seals.

11. The pet washing apparatus of claim 8, wherein said platform is horizontally and adjustably positioned between said inner vertical surfaces of said inner enclosure.

12. The pet washing apparatus of claim 8, wherein said drain conduits extend from said drains along an inner bottom surface of said inner enclosure downwardly through said outer enclosure such that said drain conduits are sealed to both said outer and inner enclosures and thereby maintain internal supply water pressure within said spatial gap.

13. The pet washing apparatus of claim 8, wherein said venturi unit is adapted to dispense and mix a liquid supplement with said pressurized supply water prior to entering said outer enclosure.

14. The pet washing apparatus of claim 8, further comprising: an inline water pump integrated to said supply water tubing and thereby increasing a pressure of said supply water.

15. A method of utilizing a pet washing apparatus for restraining and bathing a small domestic pet, said method comprising the steps of:
   providing and connecting an outer enclosure and an inner enclosure to each other such that a spatial gap is formed between said outer and inner enclosures, said inner enclosure having a plurality of water delivery apertures formed along inner vertical surfaces thereof;
   providing and affixing a venturi unit to said outer enclosure;
   providing and locating a plurality of inner seals within said spatial gap by locating said inner seals along upper horizontal perimeter edges of said inner and outer enclosures respectively;
   providing and connecting a supply water tubing to said venturi unit and a supply water source respectively;
   providing and adjustably situating a platform within said inner enclosure;

providing and locating a pair of drains at a bottom surface of said outer enclosure;
providing a plurality of drain conduits protruding downwardly from said drains;
providing and locating a drain valve along a bottom surface of said outer enclosure;
wherein pressurized supply water is introduced into said outer enclosure in such a manner that said pressurized supply water is subsequently discharged into said inner enclosure via said water delivery apertures;
draining waste water directly from said inner enclosure; and,
draining pressurized supply water directly from said spatial gap.

* * * * *